(12) United States Patent
Shivers et al.

(10) Patent No.: US 8,056,978 B2
(45) Date of Patent: Nov. 15, 2011

(54) CONVERTIBLE SEATING UNIT

(75) Inventors: Sarah Shivers, Louisville, OH (US);
Rex Lin, La Canada, CA (US); Juan Carlos Intriago Velez, Fresh Meadows, NY (US); Adina Klein, Pittsburgh, PA (US); Sujoy Chandra, Pittsburgh, PA (US); Randal Hong, Pittsburgh, PA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 195 days.

(21) Appl. No.: 12/466,835

(22) Filed: May 15, 2009

(65) Prior Publication Data
US 2009/0295201 A1 Dec. 3, 2009

Related U.S. Application Data

(60) Provisional application No. 61/054,039, filed on May 16, 2008.

(51) Int. Cl.
*A47C 7/00* (2006.01)
(52) U.S. Cl. ......... 297/283.3; 297/92; 297/94; 297/105; 297/111; 297/114; 297/118; 297/188.11; 297/230.14; 297/236
(58) Field of Classification Search ............... 297/1–3, 297/92, 94, 105, 108, 111, 114, 118, 188.11, 297/230.14, 236, 283.1, 283.2, 283.3
See application file for complete search history.

(56) References Cited

U.S. PATENT DOCUMENTS

| 821,154 | A | * | 5/1906 | Brewer | 297/63 |
| 834,427 | A | * | 10/1906 | Wheatley | 5/16 |
| 972,393 | A | * | 10/1910 | Moore | 297/236 |
| 1,379,316 | A | * | 5/1921 | Smith | 297/236 |
| 2,784,766 | A | * | 3/1957 | Hale | 297/114 |
| 3,379,471 | A | * | 4/1968 | Dalziel | 297/92 |
| 4,248,476 | A | * | 2/1981 | Phelps | 297/118 |
| 5,597,201 | A | | 1/1997 | Hinze | |
| 5,722,724 | A | * | 3/1998 | Takei et al. | 297/238 |
| 5,902,009 | A | | 5/1999 | Singh | |
| 5,934,615 | A | | 8/1999 | Treichler | |
| 5,967,602 | A | | 10/1999 | Ptak | |
| 5,997,083 | A | * | 12/1999 | Ono et al. | 297/237 |
| 6,074,000 | A | | 6/2000 | Wagner | |
| 6,082,802 | A | | 7/2000 | Vigilante, Jr. | |

(Continued)

FOREIGN PATENT DOCUMENTS
GB 2023415 * 1/1980

*Primary Examiner* — Laurie Cranmer
(74) *Attorney, Agent, or Firm* — Jeffrey P. Calfa; Mark C. Bach; Gerald W. Askew

(57) ABSTRACT

A convertible seating unit for a motor vehicle is provided. The convertible seating unit comprises a seat having an upper surface, a front edge and a rear edge. The convertible seating unit further includes a back support comprising a first back support panel and a second back support panel. Each of the first and second back support panels has a first edge and a second edge, and an upper surface and a lower surface. The second edge of the first back panel is hingeably connected to the first edge of the second back panel to define a first hinge axis. The first edge of the first back panel is hingeably connected to the seat proximate the rear edge of the seat to define a second hinge axis.

6 Claims, 3 Drawing Sheets

U.S. PATENT DOCUMENTS

| | | |
|---|---|---|
| 6,102,463 A | 8/2000 | Swanson |
| 6,161,896 A | 12/2000 | Johnson |
| 6,386,612 B2 | 5/2002 | Hofmann |
| 6,502,901 B2 * | 1/2003 | Deptolla ..................... 297/238 |
| 6,540,279 B1 | 4/2003 | Bargiel |
| 6,641,013 B2 | 11/2003 | Dise |
| 6,702,375 B1 * | 3/2004 | Laskowski et al. ...... 297/188.07 |
| 6,820,932 B2 * | 11/2004 | Misthos et al. ................ 297/232 |
| 7,458,635 B2 * | 12/2008 | Mendis et al. ................ 297/238 |

* cited by examiner

CONVERTIBLE SEATING UNIT

CROSS REFERENCE TO RELATED APPLICATION

This application claims priority from provisional U.S. Application Ser. No. 61/054,039, filed May 16, 2008 and entitled Outta Space, the teachings of which are incorporated by reference.

TECHNICAL FIELD

A seating unit for a motor vehicle, and more particularly a convertible seating unit storage system for a motor vehicle, is provided herein.

BACKGROUND

Motor vehicles, particularly trucks, are increasingly used as multipurpose vehicles. Accordingly, such motor vehicles are used to transport passengers, personal items, and business items. While the needs of a particular user may differ depending on occasion, and from one user to another, all users require a safe and secure method of transporting passengers and items in the motor vehicle. Thus, there is a need to provide a diversified storage system for motor vehicles. There is also a need for in-vehicle storage units that make efficient use of both passenger space and provide storage space. Finally, there is a need to provide a system that is easily and quickly adaptable to both transport and storage needs.

SUMMARY

A convertible seating unit for a motor vehicle is provided. The convertible seating unit is comprised of a seat having an upper surface, a front edge and a rear edge. The convertible seating unit also includes a back support comprised of a first back support panel and a second back support panel. The first and second back support panels each have a respective first edge and second edge, as well as a respective upper surface and a lower surface. The second edge of the first back panel is hingeably connected to the first edge of the second back panel to define a first hinge axis, and wherein the first edge of the first back panel is hingeably connected to the seat proximate the rear edge of the seat to define a second hinge axis.

In another embodiment, a convertible seating unit is provided. The convertible seating unit is comprised of a seat having an upper surface, a front edge and a rear edge. The convertible seating unit also includes a back support comprising a first back support panel and a second back support panel. The first and second back support panels each have a respective first edge and a second edge, as well as a respective upper surface and a lower surface. The second edge of the first back panel is connected to the first edge of the second back panel, and the first edge of the first back panel is connected to the seat proximate the rear edge of the seat. Means for connecting the second edge of the first back panel to the first edge of the second back panel to define a first hinge axis are provided. Means for connecting first edge of the first back panel to the seat proximate the rear edge of the seat to define a second hinge axis are also provided.

A method of adjusting a convertible seating unit for a motor vehicle is also provided. The convertible seating unit is provided. The convertible seating unit is comprised of a seat having an upper surface, a front edge and a rear edge. The convertible seating unit also includes a back support comprised of a first back support panel and a second back support panel. The first and second back support panels each have a respective first edge and second edge, as well as a respective upper surface and a lower surface. The second edge of the first back panel is hingeably connected to the first edge of the second back panel to define a first hinge axis, and wherein the first edge of the first back panel is hingeably connected to the seat proximate the rear edge of the seat to define a second hinge axis. According to the method, the back support is moved from a first sitting position to a second sitting position. In the first sitting position, the first and second panels of the back support are folded about the first hinge axis and extended in a direction generally transverse to the upper surface of the seat. In the second sitting position, the first panel of the back support is disposed generally parallel to the upper surface of the seat. In the second sitting position, the second panel of the back support extends in a direction generally transverse to the first panel.

Other features will be apparent to those of skill in the art from the following specification and claims, taken in conjunction with the appended drawings.

BRIEF DESCRIPTION OF THE DRAWINGS

To understand the present convertible seating unit, it will now be described by way of example, with reference to the accompanying drawings in which.

Figure 1:
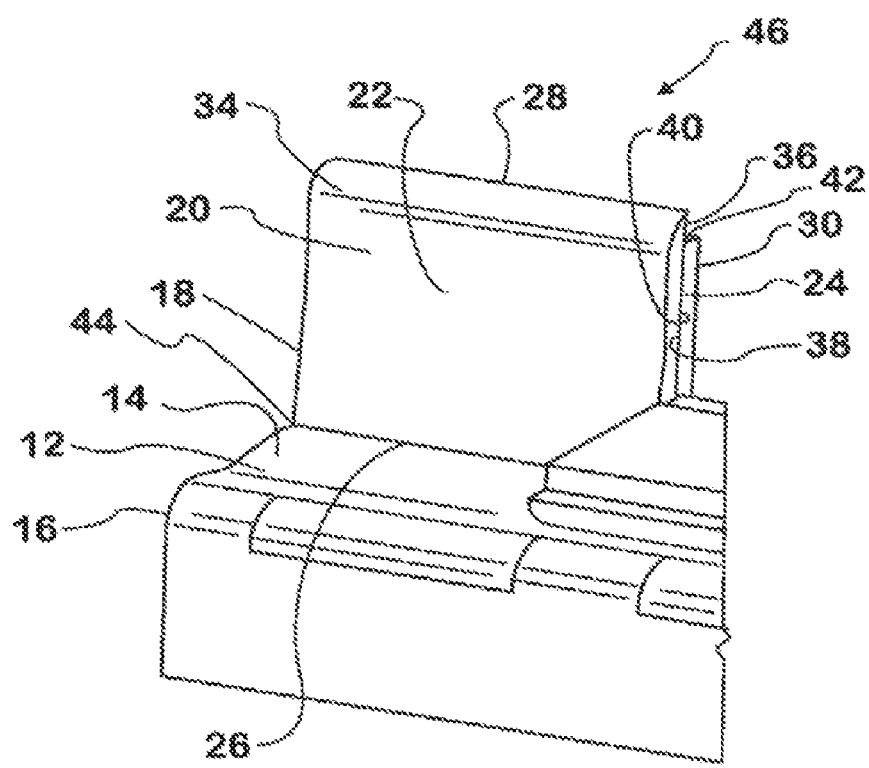
FIG. 1 is a perspective view of a convertible seating unit in the first sitting position.

The components in the drawings are not necessarily to scale, emphasis instead being placed upon clearly illustrating the principles of the convertible seating unit.

DETAILED DESCRIPTION

While this convertible seating unit described herein is susceptible of embodiments in many different forms, there is shown in the drawings and will herein be described in detail embodiments with the understanding that the present disclosure is to be considered as an exemplification of the principles of the convertible seating unit and is not intended to limit the broad aspect to the embodiments illustrated.

One embodiment of a convertible seating unit 10 is shown in FIGS. 1-6. While the convertible seating unit 10 is generally intended to be used in a motor vehicle, it is contemplated that the convertible seating unit 10 can also be used in other capacities. For example, the convertible seating unit 10 could be used in airplanes, trains, auditoriums, theaters, arenas, stadiums, homes or offices. As shown in FIG. 1, the convertible seating unit 10 generally includes a seat 12 and a back support 20. The seat 12 includes an upper surface 14 having a front edge 16 and a rear edge 18. While the upper surface 14 of seat 12 shown in FIG. 1 is shown as a bench seat, the upper surface 14 of the seat 12 should not be so limited. Accordingly, it is contemplated that the seat 12 may assume other known seat configurations such as, for example, bucket, incline or any other suitable configurations.

It is also contemplated that the convertible seating unit 10 may be made of a variety of materials, such as plastics. While the materials used should be durable and sturdy enough to support a seated user and/or any materials being stored, the material should not be too heavy or difficult to maneuver such that it is challenging for a user to convert the convertible seating unit 10.

As shown in FIG. 1, the back support 20 includes a first back support panel 22 and a second back support panel 24. The first back support panel 22 includes a first edge 26, a second edge 28, an upper surface 34 and a lower surface 36. Likewise, the second back support panel 24 includes a first edge 30, a second edge 32, an upper surface 38 and a lower surface 40. The second edge 28 of the first back panel 22 is hingeably connected to the first edge 30 of the second back panel 24 to define a first hinge axis 42. Further, the first edge 26 of the first back panel 22 is hingeably connected to the seat 12 proximate the rear edge of the seat 18 to define a second hinge axis 44.

As shown in FIG. 1, the second edge 28 of the first back panel 22 is hingeably connected to the first edge 30 of the second back panel 24 by a connecting means. Likewise, the first edge 26 of the first back panel 22 is hingeably connected to the seat 12 by connecting means. It will be understood by those of skill in the art that the connecting means can be any mechanism notable for providing a hinge joint or other pivoting connection. For example, it is contemplated that the connecting means can be an overlay hinge, an inset hinge, a concealed hinge, a double demountable hinge, a variable overlay hinge, a reverse bevel hinge, a spring hinge, a latch hinge, a spring release hinge, a butt hinge or a living hinge. The coupling means could also include pivoting links or hinge connector straps or the like.

It should also be understood that the first and second axis 42, 44 should in no way be limited to axis defined by a straight line. Instead, the first and second hinge axis 42, 44 generally define about which the first and second back panels 22, 24 can pivot.

The back support 20 is adjustable between a first sitting position 46 and a second sitting position 48. The first sitting position 46 is shown in FIG. 1, and the second sitting position 48 is shown in FIG. 3.

As shown in FIG. 1, when the back support 20 is in the first sitting position 46, the first and second panels 22, 24 of the back support 20 are folded about the first hinge axis 42 and extended generally upward from the upper surface 14 of the seat 12. It will be understood that in the first position, the first and second panels 22, 24 of the back support may extend upward from the upper surface 14 of the seat 12 at any suitable angle. In one embodiment, the first and second panels 22, 24 of the back support 20 are disposed in abutting relationship to one another. However, it will be understood that there may also be some gap or spacing between the first and second panels 22, 24 when the back support 20 is in the first sitting position 46. In one embodiment, the first panel 22 and the second panel 24 of the back support 20 are substantially parallel to one another when the first and second panels 22, 24 are arranged in the first sitting position 46.

Figure 2:
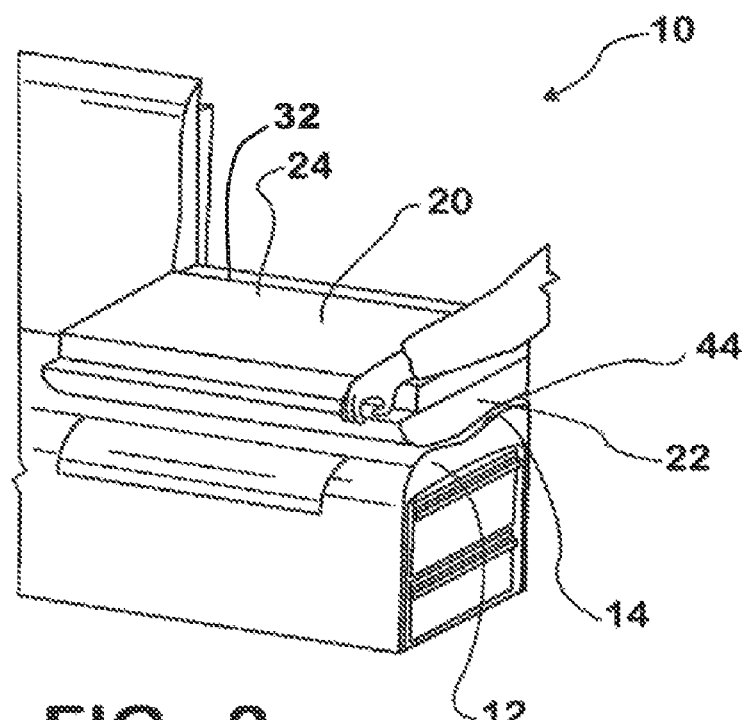
FIG. 2 is a perspective view of the convertible seating unit of FIG. 1 in an intermediate position between the first sitting position and second sitting position.
Figure 3:
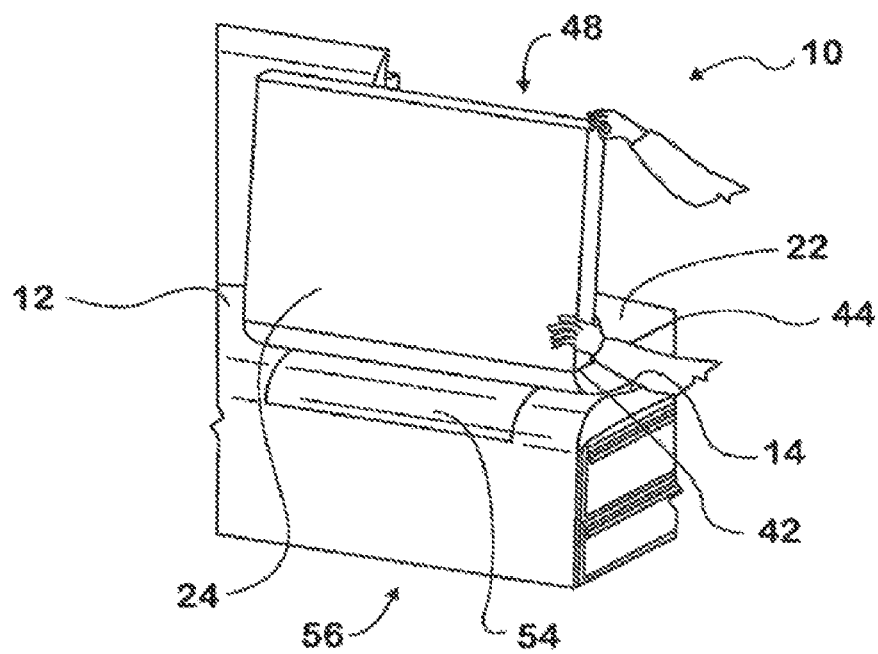
FIG. 3 is a perspective view of the convertible seating unit of FIG. 1 in the second sitting position.

As shown in FIG. 3, when the back support 20 is in the second sitting position 48, the first panel 22 of the back support 20 is disposed generally parallel to the upper surface 14 of the seat 12, and the second panel 24 of the back support 20 is folded about the first hinge axis 42 such that it extends in a direction generally transverse to the first panel 22. FIGS. 2-3 show the first panel 22 as being disposed in abutting relationship with the upper surface 14 of the seat 12 when the back support 20 is in the second position 48. It is also contemplated, however, that there may be a distance between the first panel 22 of the back support 20 and the upper surface 14 of the seat 12. For example, there may be a space created between the first panel 22 and the upper surface 14 as a result of fabric or other constraints. Alternatively, there may be studs or feet placed on either the upper surface 14 of the seat 12 or on the first panel 22 of the back support 20 that could result in creating space between the first panel 22 of the back support 20 and the upper surface 14 of the seat 12.

In one embodiment shown in FIGS. 2 and 3, the second hinge axis 44 is disposed on the upper surface of the seat 14 at a predetermined distance $D_0$ from the rear edge of the seat 18. According to this embodiment, the first edge 26 of the first panel 22 has a predetermined width $W_0$, wherein $W_0$ is less than or equal to $D_0$. This relationship between $D_0$ and $W_0$ minimizes or eliminates overhang resulting from the second panel 24 of the back support 20 extending beyond the rear edge of the seat 18. This configuration is particularly useful in instances in which the convertible seating unit 10 is positioned in a motor vehicle, or some other environment, where the rear edge 18 of the seat 12 abuts or is limited a back wall or another structure. minimizes or eliminates overhang resulting from the second panel 24 of the back support 20 extending beyond the rear edge of the seat 18. This configuration is particularly useful in instances in which the convertible seating unit 10 is positioned in a motor vehicle, or some other environment, where the rear edge 18 of the seat 12 abuts or is limited a back wall or another structure.

Figure 4:
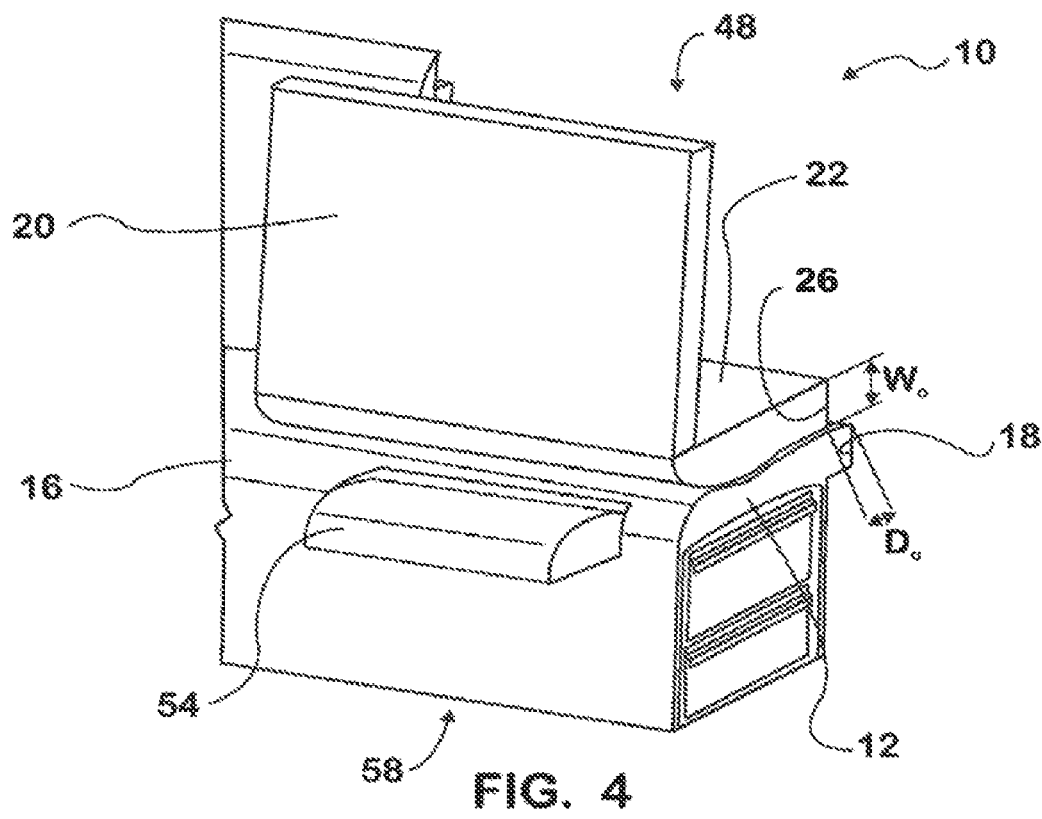
FIG. 4 is a perspective view of the convertible seating unit of FIG. 3 with the seat extension in the sitting position.
Figure 5:
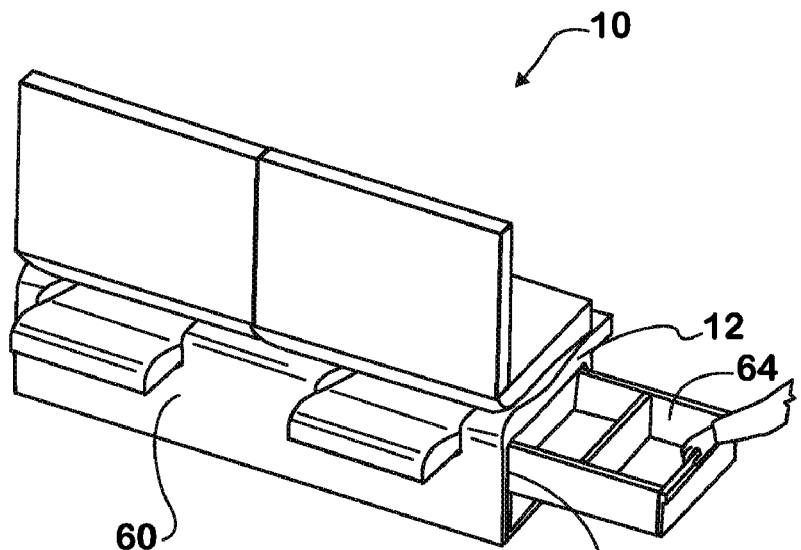
FIG. 5 is a perspective view of a convertible seating unit with the storage receptacle extending out of the storage cavity.

According to one embodiment, the convertible seating unit 10 includes a seat extension 54 attached to the seat 12. The seat extension 54 is movable between a closed position 56 (shown in FIGS. 1-3) and a sitting position 58 (FIG. 4). When the seat extension 54 is in the sitting position 58, the seat extension 54 extends beyond the front edge 16 of the seat 12 creating a sitting surface which may continue to employ the back support. This configuration allows the space behind the second panel 24 to be used for storage, or for seating of a second passenger. When the seat extension 54 is in the closed position 56, the seat extension 54 defines a portion of the upper surface 14 of the seat 12. It is contemplated that the seat extension 54 can be slidably attached to the seat 12 by conventional track and rail systems. Alternatively, the extension seat 54 can be hingeably attached to the seat 12 proximate the front edge 16 of the seat 12. In such a configuration, the extension seat can be hingeably attached employing the coupling means described herein.

In one embodiment, the convertible seating unit 10 includes at least one lower support 60 extending downward from the seat 12. The lower support 60 and seat 12 define a storage cavity 62 beneath at least a portion of the seat 12. Accordingly, the storage cavity can accommodate at least one storage receptacle 64 sized to slidably fit into the storage cavity 62. The storage cavity 62 thus makes efficient use of the space beneath the seat 12. It also serves to hide or conceal items a user may not want to be visibly apparent, such as valuable electronics, or unsightly tools and machinery. The use of a storage receptacle 64 helps to secure items within the storage cavity 62 so that the items do not simply fall out of the cavity 62. It is contemplated that if the convertible seating unit 10 is used in a motor vehicle, that the storage cavity 62 will be accessible to a user once the user steps outside of the motor vehicle and opens the door, thus creating for an easy access point.

Figure 6:
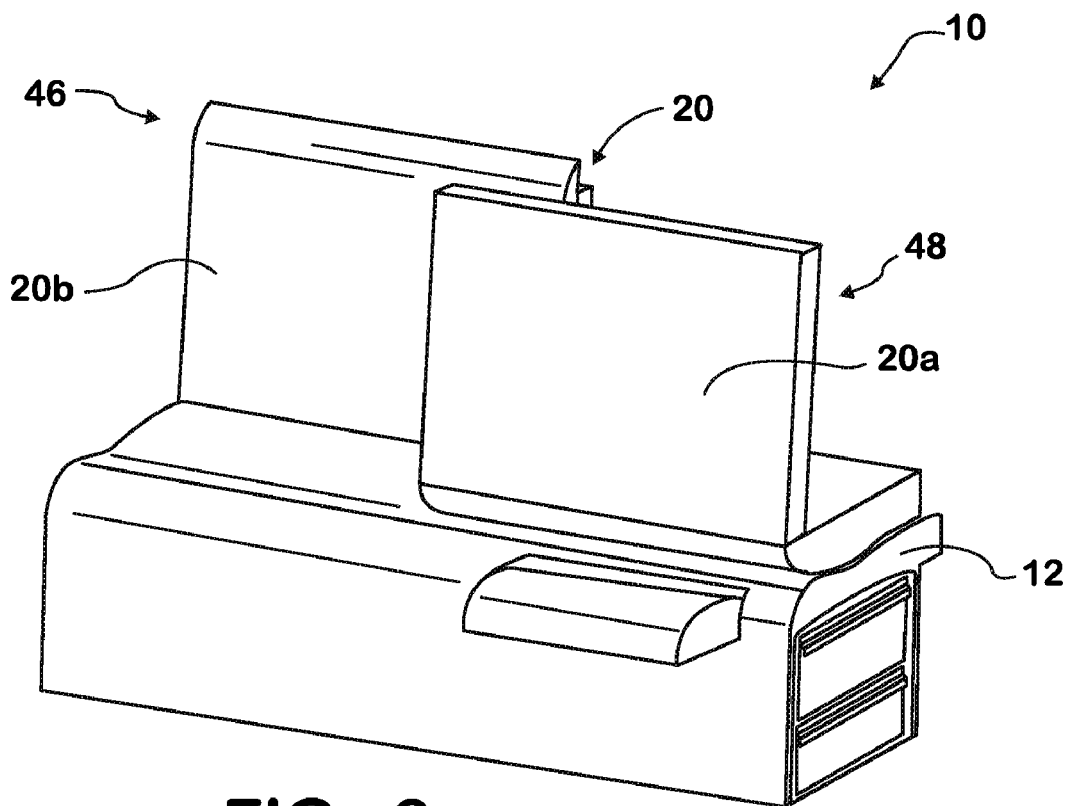
FIG. 6 is a perspective view of a convertible seating unit having a segmented back support.

It will be understood that the convertible seating unit 10 can be configured such that the back support 20 is segmented, as shown in FIG. 6. In such a configuration, a first segment 20a of the back support 10 can be moved to the second sitting position 48 while a second segment 20b of the back support 20 can be positioned in the first sitting position 46. Thus, if the back support 20 is segmented into halves, for example, half of the back support 20 can be converted into the second sitting position 48 to use the storage space behind the second panel 24 of the back support 20, while the other half of the back support 20 remains in the first sitting position 46. Alternatively, both segments of the back support 20 can assume the same first or second position. It will be understood that while the embodiment shown illustrates two back support segments 20a, 20b, it is contemplated that the back support 20 may be segmented such that it forms any number of seating segments.

In operation, the back support 20 of the convertible seating unit 10 is moved from the first sitting position 46 to the second sitting position 48 as follows. When the back support 20 is in the first sitting position 46, the first and second panels 22, 24 of the back support 20 are folded about the first hinge axis 42. The first and second panels 22, 24 extend generally in a direction transverse (e.g., upward) to the upper surface 14 of the seat 12. When the back support 20 is converted to the second sitting position 48, the first panel 22 of the back support 20 is pivoted about the second hinge axis 44 so that the first panel 22 is disposed generally parallel to the upper surface 14 of the seat 12. This step is illustrated in FIG. 2. Once the first panel 22 is generally parallel to the upper surface 14 of the seat 12, the second panel 24 of the back support 20 is folded about the first hinge axis 42 so that it extends in a generally transverse direction to the first panel 22. Although the embodiment shown in FIG. 3 illustrates the second panel 24 is substantially perpendicular to the first panel 22 in this position, it will be understood that the second panel 24 can extend at any suitable angle. In the second sitting position 48, a user may store materials in the space created behind the second panel 24 of the back support 20. The materials may be placed directly on top of the first panel 22 of the seat support. If there is a need for a user to also sit on the seat 12, the seat extension 54 may be moved to its sitting position 58. Thus, a user can simultaneously store materials behind the second panel 24 of the back support 20 while still using the seat 12.

What is claimed is:

1. A convertible seating unit for a motor vehicle comprising:
    a seat having an upper surface, a front edge and a rear edge;
    a back support adjustable between at least a first sitting position and a second sitting position, the back support comprising a first back support panel and a second back support panel, each of the first and second back support panels having a respective first edge and a second edge and a respective upper surface and a lower surface;
    wherein the second edge of the first back panel is hingeably connected to the first edge of the second back panel to define a first hinge axis, and wherein the first edge of the first back panel is hingeably connected to the seat proximate the rear edge of the seat to define a second hinge axis, and wherein the first sitting position faces a direction of vehicle travel and the second sitting position faces the direction of vehicle travel; and
    wherein in the first sitting position the first and second support panels of the back support are folded about the first hinge axis and extend in a direction generally transverse to the upper surface of the seat.

2. The convertible seating unit of claim 1, wherein in the second sitting position, the first back support panel of the back support is disposed generally parallel to the upper surface of the seat, and the second back support panel of the back support extends in a direction generally transverse to the first back support panel.

3. A convertible seating unit comprising:
    a seat having an upper surface, a front edge and a rear edge;
    a back support adjustable between at least a first sitting position and a second sitting position, the back support comprising a first back support panel and a second back support panel, each of the first and second back support panels having a respective first edge and a second edge and a respective upper surface and a lower surface, wherein the second edge of the first back panel is connected to the first edge of the second back panel, and wherein the first edge of the first back panel is connected to the seat proximate the rear edge of the seat;
    means for connecting the second edge of the first back panel to the first edge of the second back panel to define a first hinge axis; and,
    means for connecting the first edge of the first back panel to the seat proximate the rear edge of the seat to define a second hinge axis;
    wherein the first sitting position faces a first direction and the second sitting position faces the first direction; and
    wherein in the first sitting position, the first and second back support panels of the back support are folded about the first hinge axis and extend in a direction generally transverse to the upper surface of the seat.

4. The convertible seating unit of claim 3, wherein in the second sitting position the first back support panel of the back support is disposed generally parallel to the upper surface of the seat, and the second back support panel of the back support extends in a direction generally transverse to the first back support panel.

5. A method of adjusting a convertible seating unit for a motor vehicle, wherein the convertible seating unit comprises a seat having an upper surface, a front edge and a rear edge, a back support having a first back support panel and a second back support panel, each of the first and second back support panels having a respective first edge and a second edge and a respective upper surface and a lower surface, the second edge of the first back support panel being hingeably connected to the first edge of the second back support panel to define a first hinge axis, and the first edge of the first back support panel being hingeably connected to the seat proximate the rear edge of the seat to define a second hinge axis, the method comprising:
    moving the back support from a first sitting position to a second sitting position, wherein when the back support is in the first sitting position, the first and second back support panels of the back support are folded about the first hinge axis and extend in a direction generally transverse to the upper surface of the seat, and wherein when the back support is in the second sitting position, the first back support panel of the back support is disposed generally parallel to the upper surface of the seat, and the second back support panel of the back support extends in a direction generally transverse to the first back support panel, wherein the first sitting position faces a direction of vehicle travel and the second sitting position faces the direction of vehicle travel.

6. The method of 5 further comprising extending a seat extension from a closed position to a sitting position, the seat extension extending beyond the front edge of the seat in the sitting position.

* * * * *